United States Patent [19]
Van Koelen et al.

[11] Patent Number: 5,467,371
[45] Date of Patent: Nov. 14, 1995

[54] ARRANGEMENT FOR GENERATING PULSE CODE MODULATION VALUES

[75] Inventors: Gijsbertus A. Van Koelen; Paul G. Snaphaan; Gertjan Rhebergen, all of Hilversum, Netherlands

[73] Assignee: U.S. Philips Corporation, New York, N.Y.

[21] Appl. No.: 951,493

[22] Filed: Sep. 24, 1992

[30] Foreign Application Priority Data

Sep. 27, 1991 [EP] European Pat. Off. ............ 91202531

[51] Int. Cl.⁶ .................................................. H04B 14/04
[52] U.S. Cl. ......................... 375/241; 375/242; 375/377
[58] Field of Search .................................. 375/241, 242, 375/377; 381/29, 30; 348/403, 410; 341/76, 143

[56] References Cited

U.S. PATENT DOCUMENTS 4,550,425  10/1985  Andersen et al. ..................... 375/241
5,042,069   8/1991  Chhatwal et al. ....................... 381/29

FOREIGN PATENT DOCUMENTS 0216488  4/1987  European Pat. Off. .
3036379  5/1982  Germany .
3142495  5/1983  Germany .

Primary Examiner—Young Tse
Attorney, Agent, or Firm—Michael J. Balconi-Lamica; Laurie E. Gathman

[57] ABSTRACT

Arrangement for generating pulse code modulation values in a telephone set, comprising a microprocessor which includes a working store, in which the microprocessor and the working store are connected by a data bus and an address bus, further including an output circuit for outputting the pulse code modulation values, an output memory connected thereto for storing the pulse code modulation values to be output, the working store and the output memory being incorporated in a single memory circuit. The arrangement is preferably structured in such a way that it comprises an addressing device for generating, in response to the microprocessor's addressing of a random location of the output memory, an address of an output memory location to be read out.

16 Claims, 2 Drawing Sheets

ARRANGEMENT FOR GENERATING PULSE CODE MODULATION VALUES

FIELD OF THE INVENTION

The invention relates to an arrangement for generating pulse code modulation values in a telephone set, includes a microprocessor which includes a working store, the microprocessor and the working store being connected by a data bus and an address bus, the arrangement further including an output circuit for outputting the pulse code modulation values, and including an output memory connected thereto for storing the pulse code modulation values to be output. An arrangement of this type is known from practice.

DESCRIPTION OF THE PRIOR ART

The arrangements for generating pulse code modulation values (PCM values) known in practice generally includes an application circuit incorporated in an integrated circuit. The memory necessary for storing the pulse code modulation values to be generated is then also incorporated in the integrated circuit. However, such an integrated circuit including a memory is comparatively expensive. Another possibility would be for the arrangement to include its own separate memory circuit. However, this results in a greater number of components and a greater number of connections to be made so that a circuit of this type is also comparatively expensive.

SUMMARY OF THE INVENTION

It is an object of the invention to provide a relatively cost-effective arrangement for generating pulse code modulation values, which includes a memory for the pulse code modulation values to be generated while the number of components and connections is minimized. The invention uses the fact that a modem digital telephone set usually includes a microprocessor which requires a working store. According to the invention the extension by an additional memory and the use of an application circuit including an internal memory may be avoided by structuring the arrangement for generating pulse code modulation values in such a way that the working store and the output memory are included in a single memory circuit. Worded differently, the output memory is included in the same memory circuit as the working store of the microprocessor. Consequently, a separate memory circuit for the output circuit may be omitted, whereas this output circuit itself need not include a memory.

For the generation of pulse code modulation values, these values are to be transported from the output memory to the output circuit, which circuit produces a pulse code modulation value every 125 µs with a standard 8 kHz PCM sample rate. For this transport to the output circuit, the address of the memory location that contains the PCM value always output is to be fed to the output memory. Obviously, it is possible to provide an arrangement so that the microprocessor constantly generates within the output memory an address to be read out next, for example, by constantly incrementing the content of a register or a working store memory location intended for this purpose. The microprocessor in the telephone set, however, will already have a maximum load due to the multiplicity of tasks. By performing an additional task, such as updating an address value, timing problems may occur for such applications. In order to provide maximum relief of the microprocessor and thus avoid timing problems, a preferred embodiment of the arrangement according to the invention is structured such that the arrangement includes a addressing device for generating, in response to the microcomputer's addressing of a random location of the output memory, an address of an output memory location to be read out. This achieves a substantial reduction of the load of the microprocessor, because it need not constantly determine the location of the pulse code modulation value to be read out.

The arrangement is preferably structured in such a way that the addressing device comprises an address register, an address decoding circuit and a multiplexer inserted in the address bus, the multiplexer being arranged for transporting bits in response to control signals generated by the address decoding circuit, which bits come from either the address bus or the address register. The address register always carries the address, or part of the address, of the next pulse code modulation value to be generated. In that case the arrangement is preferably structured in such a way that the addressing device is arranged for incrementing the address register once the address register has been read out. This makes it possible to read a number of locations from the output memory substantially without the intervention of the microprocessor. Naturally, the addressing device may also be arranged for decrementing the address register in which case the memory locations of the output memory are read out in reverse order.

If the address register includes, for example, 8 bits, the register will assume the value of 0 when incremented to over 255. In this manner, always 256 memory locations, i.e. the number of memory locations determined by the number of bits of the register, are addressed cyclically. For (cyclically) addressing a smaller number of locations, the arrangement may advantageously be structured in such a way that the addressing device comprises a final value register and a comparator connected both to the final value register and the address register. In the final value register a final value is predetermined and not exceeded by the address register. For this purpose, the comparator constantly compares the values of the address register and the final value register and if there is equality, applies a reset signal to the address register, so that this address register assumes an initial value (for example, 0).

The addressing device causes a considerable reduction of the microprocessor load. A further reduction of this load may be obtained if the arrangement according to the invention is structured in such a way that the output circuit includes a FIFO register for temporary storage of the pulse code modulation values to be output. Pulse code modulation values read from the output memory may be temporarily stored in a FIFO register (First-In, First-Out register) before being output by the output circuit. The use of a FIFO memory need not necessarily lead to a pulse code modulation value being fed to the output circuit every 125 µs, but this only needs to happen with an average interval of 125 µs, while the permissible deviations from the average interval depend on the size of the FIFO register.

When combining the working store and the output memory in a single memory circuit, a considerable saving is already achieved on the number of connecting pins to be connected. A further saving on the number of connections may be achieved if the arrangement is structured in such a way that the microprocessor includes combined address and data outputs. In that case the addressing device may advantageously include an address latch for temporary storage of part of the address to be read out.

The arrangement according to the invention may advantageously be structured in such a way that the addressing device and the output circuit are incorporated in an application-specific integrated circuit. This minimizes the number of components and connections, whereas the application-specific integrated circuit may be manufactured relatively cost effectively due to the absence of an internal memory.

BRIEF DESCRIPTION OF THE DRAWINGS

The invention will further be explained below with reference to the drawing Figures, in which:

FIG. 1b shows a more detailed representation of the addressing circuit of FIG. 1a.

FIG. 2b shows a more detailed representation of the addressing circuit of FIG. 2a.

DETAILED DESCRIPTION OF THE PREFERRED EMBODIMENTS

Figure 1A:
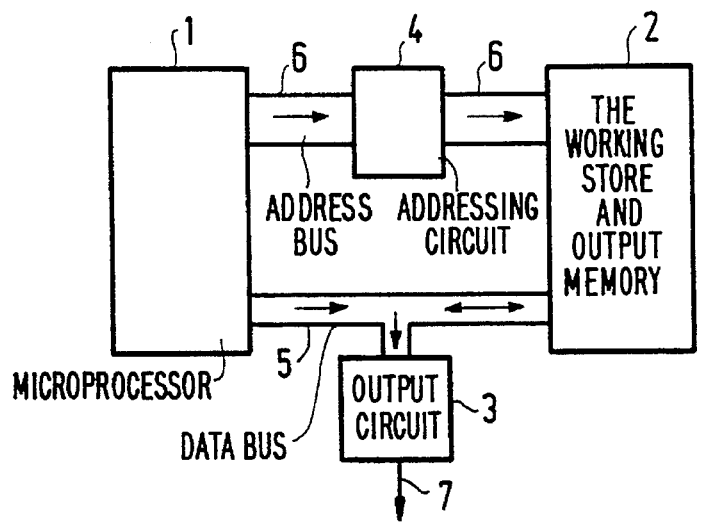
FIG. 1a shows a block diagram of a first embodiment of the arrangement according to the invention.

The circuit shown in Fig. 1a comprises a microprocessor 1, a memory 2, an output circuit 3 and an addressing circuit 4. A data bus 5 connects the memory 2 to both the microprocessor 1 and the output circuit 3. An address bus 6 connects address outputs of the microprocessor 1 to address inputs of the memory 2. The addressing circuit 4 is inserted in the address bus 6. The output circuit 3 may include, for example, a parallel-to-serial converter and/or a buffer. In the embodiment shown a serial bus 7 is connected to the output circuit 3.

The memory 2 includes both the working store which is for use by the microprocessor 1 and the output memory for use by the output circuit 3. The working store accommodates, for example, the program of the microprocessor 1, while the output memory accommodates the pulse code modulation values to be output. According to the invention the circuit is preferably arranged in such a way that the output memory covers a successive number of addresses of the memory 2. This renders a relatively simple addressing of the output memory possible.

For addressing the output memory, the addressing circuit 4 is arranged in such a way that when the microprocessor 1 addresses a random location in the memory 2 belonging to the output memory, the address to be read out is produced by the addressing circuit 4. For this purpose, the addressing circuit 4 in a first preferred embodiment of the arrangement according to the invention is structured as shown in the block diagram of FIG. 1b.

Memory 2, which is preferably of the RAM type (Random Access Memory), may be connected to a further memory (not shown) of the ROM type (Read-Only Memory). In the further memory, series of PCM values may be stored which are loaded in the memory 2 as required. The memory 2 may be loaded under the control of the microprocessor 1.

Figure 1B:
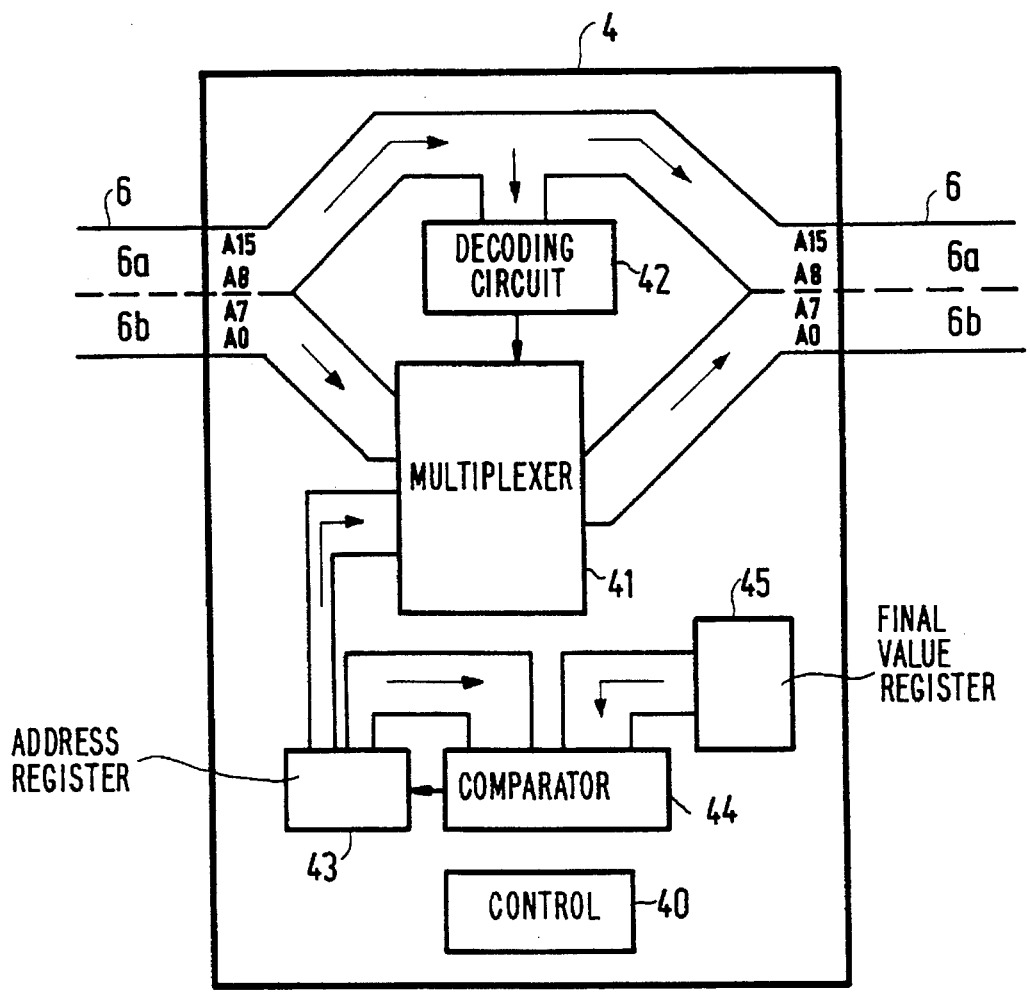

In the addressing circuit 4 shown in FIG. 1b a first group 6a of the address lines of the address bus 6 is connected directly to memory 2. In the embodiment shown this first group 6a includes eight address lines A8 to A15. A second group 6b of the address lines of the address bus 6, in this case the lines A0 to A7, is connected to memory 2 via a multiplexer 41. The multiplexer 41 is structured in such a way that, in response to a control signal generated by a decoding circuit 42, either the second group 6b i.e. the address lines A0 to A7, or the address register 43 is connected to the part of the address bus 6 leading to the memory 2. The first part 6a of the address bus is led to the decoding circuit 42. If the microprocessor 1 places an address belonging to the working store on the address bus 6, the multiplexer 41 will connect the group 6b, so that this complete address reaches memory 2. However, if the microprocessor 1 places an address belonging to a location of the output memory on the address bus 6, the multiplexer 41 will connect the address register 43 to the data bus 6 and the part of the address placed in the section 6b of the address bus 6 by the microprocessor 1 will not reach the memory 2. For this purpose, the decoding circuit 42 is arranged in such a way that the decoding circuit generates a signal which makes the multiplexer 41 connect the address register 43 to the address bus 6 when a random memory location belonging to the output memory is addressed by the microprocessor 1. In essence, all the address lines of the address bus 6 may be connected to the decoding circuit 42. However, the memory 2 is preferably arranged in such a way that the output memory covers a restricted number of, for example, 256 successive locations. In that case not all the address lines, but only, for example, eight address lines, need to be connected to the decoding circuit, as is shown in FIG. 1b.

Preferably, the addressing circuit 4 is arranged in such a way that the address register 43 is incremented each time an address is generated. Consequently, it is possible to sequentially read the output memory in a simple manner. If the addressing circuit 4 has this structure, it is not necessary for the microprocessor 1 to update the addresses of the output memory locations to be read out. This means a considerable relief of the load of the microprocessor 1, so that the latter has more time available for other tasks and that timing problems, if any, are avoided as much as possible.

The addressing circuit 4 may advantageously comprise a comparator 44 and a final value register 45. They make it possible to cyclically read a smaller number of locations than the maximum number of locations determined by the number of bits of the address register 43. The comparator 44 constantly compares the content of the address register 43 with that of the final value register 45. If the values are identical, the comparator 44 produces a reset signal, so that the address register assumes an initial value (for example, 0). The addressing circuit 4 may also include a control 40 for controlling the components of the addressing circuit 4 in response to signals produced by microprocessor 1.

Figure 2A:
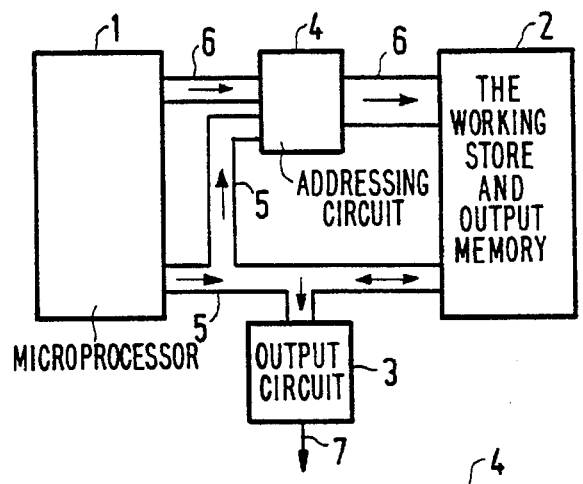
FIG. 2a shows a block diagram of a second embodiment of the arrangement according to the invention.

The circuit shown in FIG. 2a likewise includes a microprocessor 1, a memory 2, an output circuit 3 and an addressing circuit 4. This circuit likewise includes a data bus 5 and an address bus 6, the addressing circuit 4 being inserted in the address bus 6. For a maximum restriction of the number of connections, a microprocessor 1 is used which has at least several combined data and address outputs, such as the Intel 80C31. With this type of microprocessor the eight least significant bits of the 16-bit address are supplied over the data bus, so that eight connecting pins are saved. The address bus 6 located between the microprocessor 1 and the addressing circuit 4 thus comprises only eight address lines in the represented embodiment. These eight address lines correspond to those of the first section 6a of the address bus 6 shown in FIGS. 1a and 1b. The remaining eight address lines are provided by the 8-bit data bus 5 which is also connected to the addressing circuit 4 in the embodiment shown. The address bus 6 located between the addressing circuit 4 and the memory 2 comprises sixteen address lines as does the embodiment represented in FIG. 1a. When the microprocessor 1 represented in FIG. 2a is to read a location from the memory 2, it places the eight most significant bits of the address on the address bus 6a and the eight least significant bits of the address on the data bus 5. Since the data bus 5 in the represented arrangement is also connected to the addressing circuit 4, the addressing circuit 4 receives all sixteen bits of the address to be read out. Subsequently, sixteen address bits are placed on the address bus 6 and applied to the memory 2.

Figure 2B:
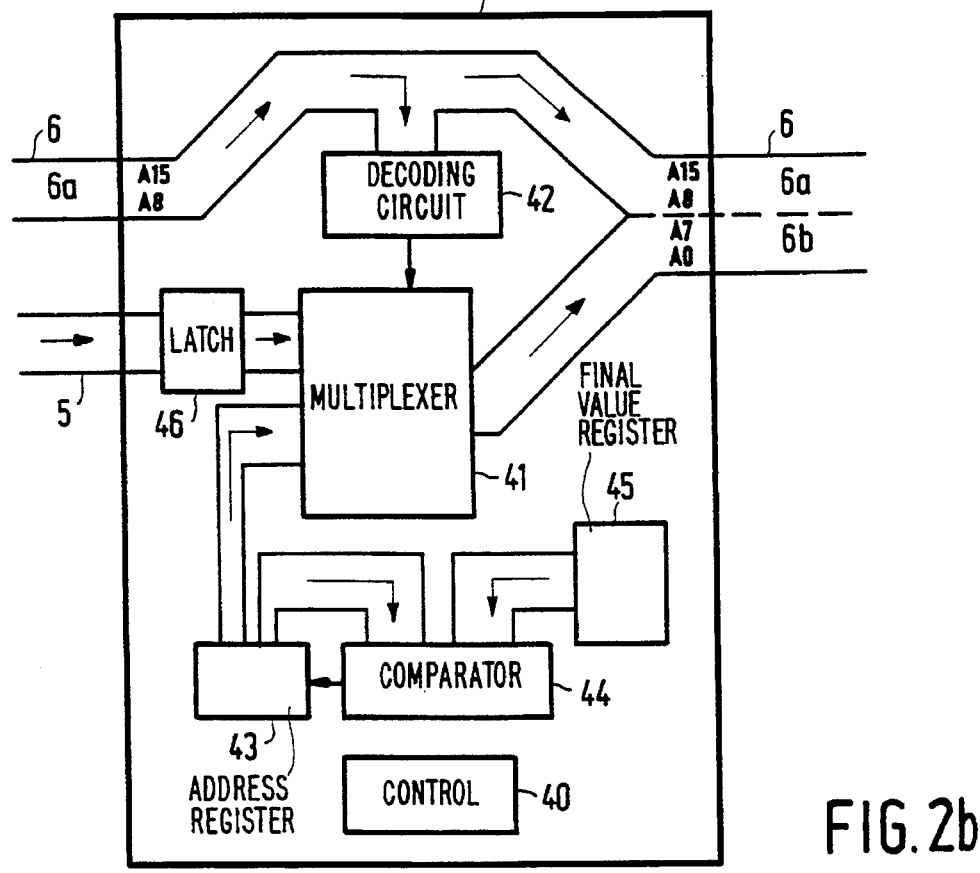

FIG. 2b gives a more detailed representation of the addressing circuit 4 shown in FIG. 2a. The addressing circuit shown in FIG. 2b includes a multiplexer 41 whose outputs are connected to the address bus 6. A first set of inputs of the multiplexer 41 is connected to an address register 43, a latch 46 being connected to a second set of inputs. The multiplexer 41 connects either the first set of inputs or the second set of inputs to the outputs in response to a control signal generated by a decoding circuit 42. The data bus 6a, on which the eight most significant bits of the address are placed during the addressing operation of the microprocessor 1, is connected to the decoding circuit 42. On the basis of these eight address bits, the decoding circuit 42 determines whether the microprocessor 1 addresses a memory location in the output memory. If it does, the multiplexer 41 places the content of the address register 43 in the (least significant) section 6b of the address bus 6. If it does not and if the microprocessor 1 addresses a location in the working store, the content of the latch 46 is placed in the section 6b of the address bus 6. The address component transported over the data bus 5 had already been written in this latch 46 in response to control signals coming from the microprocessor 1. In this manner the addressing circuit always places a sixteen-bit address on the address bus 6, this address being constituted by either the components of an address in the working store that have been transported over the address bus 6a and the data bus 5, or the component of an address in the output memory that has been transported over the address bus 6a as well as the content of the address register 43. Since the value of this address register 43 is updated by the addressing circuit 4 itself, for example, by incrementation of the address register 43 after a reading operation, the microprocessor 1, for periodically reading the output memory, needs to read only a random address from this output memory without the need for knowing the address of the next location to be read out. In practice this means a considerable reduction of the load of the microprocessor 1.

Similar to the addressing circuit represented in FIG. 1b, the addressing circuit 4 shown in FIG. 2b includes a comparator 44 and a final value register 45 whose functions have already been described with reference to FIG. 1b. The addressing circuit 4 may include a control 40 for controlling the components of the addressing circuit 4 in response to signals produced by the microprocessor 1.

Figure 3:
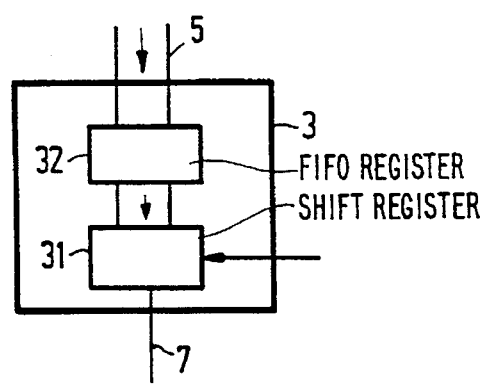
FIG. 3 shows a block diagram of a preferred embodiment of an output circuit to be used in an arrangement as shown in FIG. 1 or FIG. 2.

FIG. 3 shows a preferred embodiment of an output circuit 3. The output circuit 3 includes a shift register 31 and a FIFO register 32. The FIFO register 32, which is connected to the data bus 5, receives control signals from the microprocessor 1 for constantly reading a pulse code modulation value received over the data bus 5. In response to an external signal applied to the shift register 31 every 125 µs, this register 31 places the pulse code modulation value present therein on the serial bus 7. Once the last bit of this pulse code modulation value has been placed on the bus, the shift register 31 simultaneously reads a next value from the register 32.

In lieu of a FIFO register 32, also an ordinary register may be used. The FIFO register, however, is advantageous in that a more flexible timing of the microprocessor is possible.

We claim:

1. An arrangement for generating pulse code modulation values in a telephone set, comprising:

a microprocessor;

a working store for use by the microprocessor;

data bus means for coupling said microprocessor to said working store and for transmitting data from the microprocessor to the working store;

an output circuit, coupled to the microprocessor via the data bus means, for outputting the pulse code modulation values;

output memory means, coupled to the output circuit and the microprocessor via the data bus means, for storing the pulse code modulation values, said output memory means including addressable memory locations, said output circuit for reading the pulse code modulation values from the output memory means via the data bus and not from the microprocessor, the output memory means and the working store being comprised in a single memory circuit; and address bus means for coupling the microprocessor to the working store and the output memory means and for transmitting addresses for addressing the working store and the output memory means.

2. The arrangement as claimed in claim 1, characterized in that the output circuit comprises a FIFO register for temporary storage of the pulse code modulation values to be output.

3. The arrangement as claimed in claim 1, characterized in that the output circuit comprises a parallel-to-serial converter.

4. The arrangement as claimed in claim 1, characterized in that the microprocessor comprises at least several combined address and data outputs.

5. The arrangement according to claim 1, further including addressing means, coupled to the microprocessor the working store and the output memory means, for generating and selecting an output memory location address in response to the microprocessor requesting an output memory location.

6. The arrangement as claimed in claim 5, characterized in that the addressing means comprises an address latch for temporary storage of a portion of the address to be read out, and wherein the data bus means carries the portion of the address to be read out instead of the address bus means carrying the portion of the address to be read out, the address latch being coupled to the data bus means.

7. The arrangement as claimed in claim 5, characterized in that the addressing means and the output circuit are incorporated in an application-specific integrated circuit.

8. The arrangement as claimed in claim 5, wherein the addressing means comprises:

a) an address register for generating addresses of the output memory locations;

b) multiplexing means coupled to the address bus means for connecting the address bus to the working store and for connecting the address register to the output memory means;

c) address decoding means for decoding addresses generated by the microprocessor into addresses for addressing the working store and addresses for addressing the output memory means and for causing the multiplexing means to connect the address bus to the working store, and the address register to the output memory means.

9. The arrangement as claimed in claim 8, wherein said address register serially increments the output memory location address.

10. The arrangement as claimed in claim 9, wherein the addressing means further comprises:

a final value register containing a predetermined number; and a comparator for comparing the predetermined number with the address contained in the address register and for resetting the address register if the address contained in the address register equals the predetermined number.

11. The arrangement as claimed in claim 10, wherein the addressing means further comprises an address latch for temporary storage of a portion of an address to be read out, and wherein the data bus means carries the portion of the address to be read out instead of the address bus means carrying the portion of the address to be read out, the address latch being coupled to the data bus means.

12. The arrangement as claimed in claim 11, characterized in that the output circuit comprises a FIFO register for temporary storage of the pulse code modulation values to be output.

13. The arrangement as claimed in claim 12, characterized in that the output circuit comprises a parallel-to-serial converter.

14. The arrangement as claimed in claim 13, characterized in that the microprocessor comprises at least several combined address and data outputs.

15. The arrangement as claimed in claim 14, characterized in that the addressing means and the output circuit are incorporated in an application-specific integrated circuit.

16. An arrangement for generating pulse code modulation values in a telephone set, comprising:

a microprocessor;

a working store for use by the microprocessor;

data bus means for coupling the microprocessor to the working store and for transmitting data from the microprocessor to the working store;

an output circuit, coupled to the microprocessor via the data bus means, for outputting the pulse code modulation values;

output memory means, coupled to the output circuit and the microprocessor via the data bus means, for storing the pulse code modulation values, the output memory means including addressable memory locations, the working store and the output memory means being comprised in a single memory circuit;

address bus means for coupling the microprocessor to the working store and the output memory means and for transmitting addresses for addressing the working store and the output memory means; and addressing means, coupled to the microprocessor, the address bus means, the working store and the output memory means, for generating and selecting an output memory location address in response to the microprocessor requesting an output memory location.

* * * * *